Aug. 10, 1926.
E. MULLERN
1,595,613
ENGINE PISTON
Filed Nov. 28, 1924
2 Sheets-Sheet 1
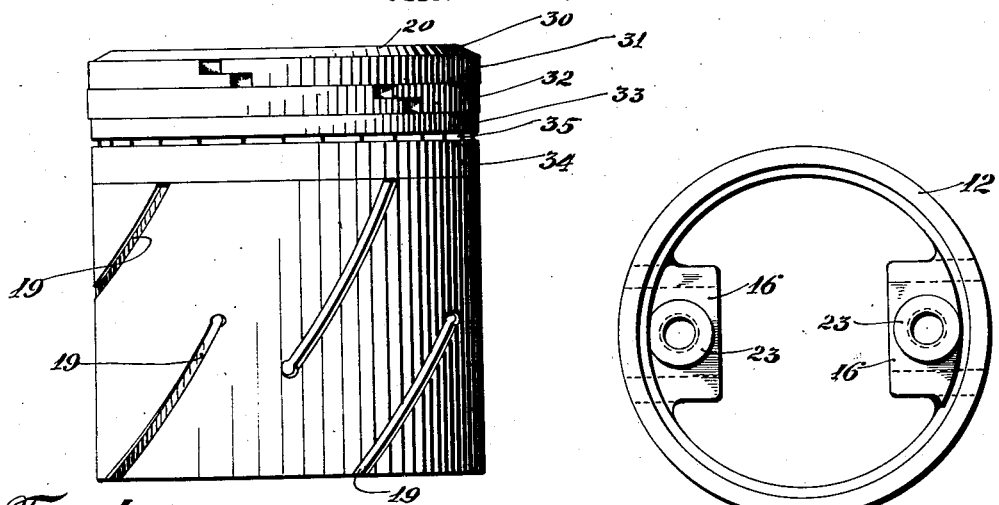
Fig. 1.
Fig. 4.
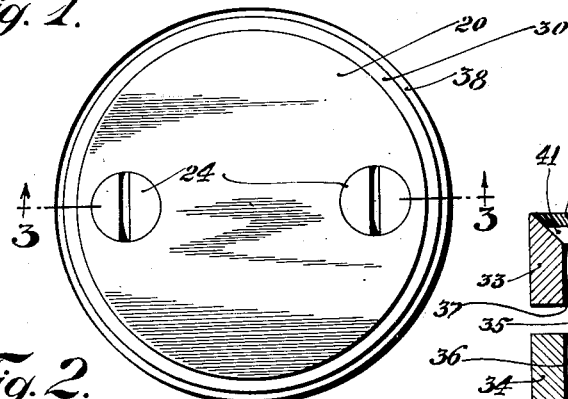
Fig. 2.
Fig. 5.
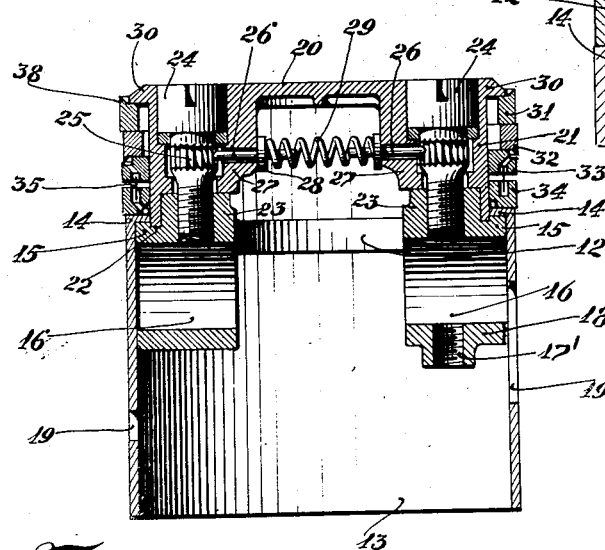
Fig. 3.
INVENTOR
Emil Mullern
By his Attorney

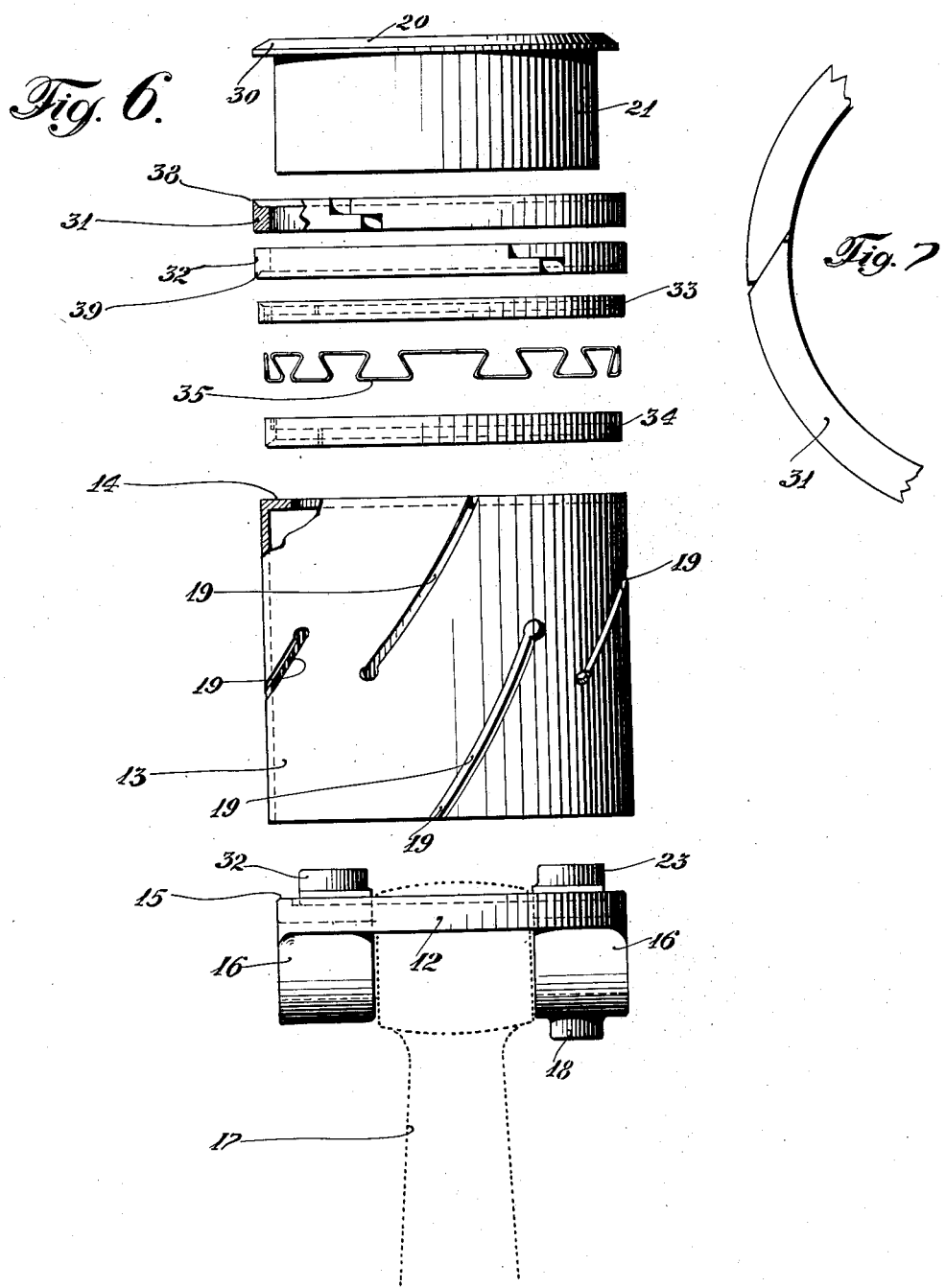

Patented Aug. 10, 1926.

1,595,613

UNITED STATES PATENT OFFICE.

EMIL MULLERN, OF NORTH ARLINGTON, NEW JERSEY.

ENGINE PISTON.

Application filed November 28, 1924. Serial No. 752,546.

Among the principal objects which the present invention has in view are: to permit the removal of the head section of a piston; to provide separable structural elements for a piston to facilitate removals and repair; to avoid the scoring of a cylinder by the wrist-pin of the connecting rod; to lighten the weight of the piston; to provide a separable skirt or guiding element independently constructed to obtain results peculiarly desirable in the element mentioned; to accommodate the expansion and contraction of the skirt incident to the service thereof; to distribute the wear on the piston incident to service; to distribute the lubricant within the cylinder; to prevent the admission of lubricant into the explosion chamber of the cylinder fitted with pistons of this character; to prevent the escapement of explosive gases during the power stroke of the piston; to maintain the working relation of the parts of the piston and of the rings thereof.

*Drawings.*

Figure 1 is a side view of a piston constructed and arranged in accordance with the present invention.

Figure 2 is a top plan view thereof.

Figure 3 is a vertical section thereof, the section being taken on the line 3—3 in Figure 2.

Figure 4 is a top plan view of the skeleton body of the piston.

Figure 5 is a detailed view on enlarged scale showing in section the means employed in the present invention for mounting the lowermost oil wiping ring.

Figure 6 is a schematic view showing in side elevation and in separated aligned relation the various parts which when assembled form the herein disclosed piston.

Figure 7 is a detailed view on enlarged scale showing as in plan fragments of a piston ring at the lapped joint ends thereof.

*Description.*

As seen in the drawings, the assembled parts are primarily united with and supported by a skeleton ring 12. The ring 12 fits snugly within the piston skirt 13 and supports the same, an inner flange 14 on the said skirt overhanging and lapping upon the ledge 15 of the ring.

Integrally formed with and dependent from the ring 12 are bored bearings 16 to receive a wrist-pin by which the ring and parts associated therewith are supported upon a connecting rod 17.

It will be noted that the wrist-pin does not extend through the side or wall of the skirt 13 and therefore cannot under any conditions abrade or score the inner wall of the cylinder in which the piston moves. To hold the wrist-pin firmly in position provision is made for the introduction of a set screw to bear upon the wrist-pin, a threaded perforation 17' being provided in the boss 18 pendent from one of the bearings 16.

The skirt 13 as shown best in Figure 6 of the drawings is provided with a series of edge opening slots 19. The slots 19 are preferably inclined as shown in Figure 6 of the drawings, and the inner ends of each interleave the slots extending from the opposite end of the cylinder as likewise shown in Figure 6 of the drawings. The interleaving of the slots in the manner referred to provides for an even expansion of the metal circumferentially, there being no solid continuation of the metal in any transverse plane of the skirt.

The slots are inclined also for the purpose of spreading or distributing any oil which might be collected from the sides of the cylinder. The inclination of the slots also operate to slightly track from the sides of the cylinder with the result that the skirt 13 is rotated within the cylinder and about the ring 12.

It will be understood that the skirt 13 may be constructed of any suitable material such as light quality of steel, or if desired, aluminum.

The head 20 has a cylindrical body 21, the lower edge of which fits within an annular groove 22 formed in the ring 12. The head 20 is secured in service to the ring 12 and to tapped bosses 23 thereof. The bosses 23 are tapped to engage the threaded ends of the heavy screws 24. The screws 24 are preferably saw-cut and are provided with shanks in which are formed serrations 25.

The serrations 25 are provided to cooperate with pins 26 which are reciprocatively mounted in perforations formed in the head 20 and in bosses 27 formed at the interior thereof. The pins 26 are each provided with a flange head 28 to receive the pressure of the spreading spring 29.

From the foregoing it will be seen that when the head 20 has been adjusted upon the ring 12 and the screws 24 have been driven into the bosses 23, the pins 26 successively fall into serrations 25 and hold the screws 24 against further or subsequent rotation.

It will also be seen that the ends of the bosses 27 and the bosses 23, as well as the lower edge of the body 21 and the groove 22, fit snugly to move as a single unit with the ring 12 and parts associated therewith when the explosion occurs.

Intermediate the flange 14 of the skirt 13 and tapered flange 30 of the head 20 is formed a ring groove in which the rings 31, 32, 33 and 34 are disposed.

The combined height of the rings 31, 32, 33 and 34 is slightly less than the distance between the flanges 14 and 30. The difference is made up or compensated for by means of the cushion spring 35. The spring 35, as seen best in Figure 6 of the drawings, is a corrugated spring preferably constructed of wire to fit within the grooves 36 and 37, formed in the abutting edges of the rings 33 and 34. The spring 37 as best shown in Figure 3 of the drawings supports in nested relation the rings 31, 32 and 33. The yield of the spring 35 permits a slight lift of the ring 34 and skirt 13 in the action of the piston which in turn facilitates and permits the rotation of the said skirt.

As seen best in Figure 6 of the drawings the rings 31 and 32 have inclined flanges 38 and 39, the said flanges being turned relatively in opposite directions. It will be noted by reference to Figure 3 of the drawings that the flange 38 extends slightly beyond the flange 30 of the head 20. The inclination of the wall of the flange 38 is such that when the gases are exploded, the impact on the flange 38 is such as to instantly expand the ring 31. In this manner any loss of expansive gas is avoided at the moment of highest gas pressure in the cylinder.

The flange 39 as is best seen in Figure 6 of the drawings is extended downward, the purpose being to gather any oil which has been brought up into the cylinder by the skirt 13 and parts associated therewith and to move the same downward.

To provide for accumulation of the oil under the flange 39, the ring 33 has a groove 40 formed in the upper edge thereof to receive the accumulated oil.

To drain the groove 40 perforations 41 are formed therein at intervals, said perforations 41 as shown best in Figure 5 of the drawings open into the groove 37 in which is disposed the cushion spring 35. The ring 34 has opening therefrom at the bottom thereof, a series of perforations 42 which open upon the flange 14 and overflowing which, it passes over the ring 12 to the inside of the skirt 13.

From the foregoing, it will be seen that a piston constructed in accordance with the present disclosure will allow for the removal of the head 20 which in service receives the impact of the explosion and if there be any deposit, all deposits of carbon.

To remove the carbon, or make other repair to the head 20, the screws 24 may be withdrawn and the head thereafter be lifted from the ring 12. The head 20 and parts associated therewith may now be carried to a bench or other suitable location for work, and the necessary repairs be expertly made and at leisure. When the repairs have been made, the head 20 and parts associated therewith are returned to the cylinder and the screws 24 being disposed in position the head and parts associated therewith are mounted as in service.

From the foregoing it will be seen that should a wrist-pin become broken or portions thereof chipped, the skirt 13 prevents the extension of the broken pin or parts thereof in a manner to injure the walls of the cylinder.

It is obvious that the working parts of the piston may be altered or replaced at will without necessitating the removal of the wrist-pin and parts associated therewith.

*Claims.*

1. A piston as characterized comprising a body portion operatively connected with the connecting rod of an explosive engine; a piston head removably connected with said body portion; a ring carried by said head; means for expanding said ring by the pressure of explosive fuel in the cylinder of said engine; a cylindrical skirt member enveloping said body portion, said skirt being supported by said body portion; a wrist-pin mounted in said body portion within said skirt member; and yielding means for holding said skirt member in operative relation to said body member, said means being adapted to permit rotation of said skirt member relative to said body member.

2. A piston as characterized comprising a body portion operatively connected with the connecting rod of an explosive engine; a piston head removably connected with said body portion; a ring carried by said head; means for expanding said ring by the pressure of explosive fuel in the cylinder of said engine; a cylindrical skirt member enveloping said body portion, said skirt being supported by said body portion; a wrist-pin mounted in said body portion within said skirt member; and yielding means for holding said skirt member in operative relation to said body member, said means embodying a plurality of wiper rings disposed in paired relation and supported upon said skirt member, and a spring member disposed between said rings to exert a separating strain thereon.

3. In a piston as characterized, a body portion adapted to be operatively connected with a wrist-pin of an internal combustion engine; a skirt member removably carried in service by said body portion; and means for revolving said skirt member around said body portion.

4. In a piston as characterized, a body portion adapted to be operatively connected with a wrist-pin of an internal combustion engine; a skirt member removably carried in service by said body portion; and means for revolving said skirt member around said body portion, said means embodying a series of open-ended slots formed in the said skirt portion and disposed in inclined relation to the axis thereof.

5. In a piston, in combination, a body portion adapted to be operatively connected to a wrist-pin of an internal combustion engine, a cylindrical skirt member removably carried by said body portion, yielding means for holding said skirt member in operative relation to said body member, and means for revolving said skirt member around said body portion.

6. In a piston, in combination, a body portion adapted to be operatively connected to a wrist-pin of an internal combustion engine, a cylindrical skirt member removably carried by said body portion, a plurality of rings supported upon said skirt member, a piston head removably secured to said body portion and adapted to retain said rings in place, and a spring member disposed between said rings to exert a separating strain thereon, whereby said skirt member may move slightly relative to said body portion.

EMIL MULLERN.